United States Patent [19]
Mulder

[11] Patent Number: 5,513,239
[45] Date of Patent: Apr. 30, 1996

[54] X-RAY EXAMINATION APPARATUS

[75] Inventor: Jakob W. Mulder, Eindoven, Netherlands

[73] Assignee: U.S. Philips Corporation, New York, N.Y.

[21] Appl. No.: 330,648

[22] Filed: Oct. 28, 1994

[30] Foreign Application Priority Data

Oct. 28, 1993 [BE] Belgium .................................. 9301153

[51] Int. Cl.⁶ ..................................................... H05G 1/64
[52] U.S. Cl. .......................................... 378/98.7; 378/98.2
[58] Field of Search .................................... 378/98.7, 108

[56] References Cited

U.S. PATENT DOCUMENTS 5,003,572  3/1991  Meccariello ........................... 378/98.7

FOREIGN PATENT DOCUMENTS 2610845  9/1977  Germany .

Primary Examiner—Craig E. Church
Attorney, Agent, or Firm—Jack D. Slobod

[57] ABSTRACT

An X-ray examination apparatus is provided with an exposure control for controlling the X-ray source and for adjusting the signal amplification of the television camera which converts the image on the exit window of the X-ray image intensifier into a video signal. The signal amplification of the television camera is adjustable so as to enable the reproduction of a wide dynamic range of images on the exit window with adequate image contrast and image brightness. In order to avoid annoying transitions in image brightness due to the variation of exposure control signals, the exposure control is configured to supply a control signal which varies smoothly in response to changes in image brightness and image contrast, for example during fluoroscopy where a series of images is formed by X-ray exposure. In a preferred embodiment the exposure control supplies a control signal which varies linearly between minimum and maximum levels as a function of mean brightness.

12 Claims, 2 Drawing Sheets

X-RAY EXAMINATION APPARATUS

BACKGROUND OF THE INVENTION

1. Field of the Invention

The invention relates to an X-ray examination apparatus, comprising an X-ray source for forming an X-ray image by irradiation of an object by means of X-rays, an X-ray image intensifier for convening the X-ray image into an optical image, and an image pick-up device for forming an electronic image signal from the optical image, which image pick-up device comprises an exposure control device for applying a control signal, derived from the electronic image signal, to a control input of an amplifier of the image pick-up device, which exposure control device comprises a selector for selecting at least one measuring field in the optical image, a maximum detector for detecting a maximum level derived from a maximum value of signal amplitudes of the image signal corresponding to at least one measuring field, a minimum detector for detecting a minimum level derived from a minimum value of signal amplitudes of the image signal corresponding to at least one measuring field, and a mean value detector for detecting a mean level derived from a mean value of signal amplitudes of the image signal corresponding to at least one measuring field.

2. Description of the Related Art

An X-ray examination apparatus of this kind is known from German Auslegeschrift DE 26 10 845.

The known X-ray examination apparatus utilizes the mean value of the image signal in the measuring field as an X-ray control signal for controlling a power supply for the X-ray source in order to control the exposure time, or the X-ray pulse duration, so as to achieve adequate image contrast and image brightness and to limit the X-ray dose whereto a patient to be examined is exposed. The known X-ray examination apparatus comprises a selector switch for selecting one of six predefined measuring fields. Furthermore, in the known X-ray examination apparatus the relative difference between a maximum signal amplitude and a minimum signal amplitude is used for the control signal for adjustment of the signal amplification of the electronic image signal. The amplifier derives an amplified video signal from the electronic image signal, which video signal is applied to a monitor for display of an image. In the case of such control of the signal amplification, involving only the minimum and the maximum signal amplitudes without taking into account notably the mean signal amplitude, sudden transitions often occur in the image brightness of an image displayed on the monitor in the event of variation of objects reproduced in the measuring field of the optical image. Notably in the case of dynamic imaging, for example during fluoroscopy, sudden variations occur in image brightnesses of the successive images reproduced on the monitor.

SUMMARY OF THE INVENTION

It is inter alia an object of the invention to provide an X-ray examination apparatus in which disturbances by the exposure control are minimized during dynamic imaging.

To achieve this, an X-ray examination apparatus in accordance with the invention is characterized in that the exposure control is also operative to form the control signal with the maximum level when the mean level exceeds a first limit value, with the minimum level when the mean level drops below a second limit value, and with a signal level which varies smoothly between the two limit values as a function of the mean level.

The brightness of the optical image on the exit window of the X-ray image intensifier is dependent on the degree of attenuation of the X-rays in the irradiated object. An image pick-up device, notably a video camera, picks up the optical image and converts it into a video signal whereby the image is subsequently reproduced, for example on a monitor. In order to adapt the brightness of the image reproduced, the X-ray examination apparatus in accordance with the invention comprises an exposure control means which supplies a control signal for adjustment of the amplifier of the image pick-up device. Consequently, an optical image of low brightness on the exit window and an optical image of high brightness on the exit window are reproduced as images of more or less the same brightness, for example on the monitor. In order to ensure that the brightness of the image reproduced remains more or less the same when the brightness of the optical image on the exit window changes, the exposure control of the X-ray examination apparatus in accordance with the invention supplies a smoothly varying control signal. This control signal is used to adjust the amplifier smoothly when the brightness of the optical image on the exit screen changes. Furthermore, the image contrast in the measuring field in the optical image on the exit screen is taken into account for the control of the amplifier in that the maximum level and the minimum level of the control signal are derived from the image contrast, i.e. from minimum and maximum signal amplitudes in the measuring field. As a result, the amplifier is adjusted so that it supplies a video signal which is Suitable for the display of the image with an optimum image contrast on, for example a monitor. Notably in the case of dynamic imaging, such as fluoroscopy, the exposure control with smooth adjustment of the amplifier offers the advantage that the mean brightness of the image displayed always maintains at substantially the desired value, despite variation of the mean brightness and the image contrast on the exit window. Consequently, there are no artificial brightness variations and image contrast variations which affect the diagnostic quality of the images reproduced. Moreover, because it is not necessary to adjust the amplifier separately, during which adjustment the object is irradiated but no image of adequate diagnostic quality is formed, the radiation dose applied to the object is efficiently used; this is an advantage with a view to possible detrimental side-effects of X-rays on living organisms during medical examinations.

A preferred embodiment of an X-ray examination apparatus in accordance with the invention is characterized in that the minimum level, the maximum level and the limit values are adjustable.

In this embodiment of an X-ray examination apparatus in accordance with the invention, the variation of the control signal level, and hence the variation of the adjustment of the amplifier as a function of the brightness and of the image contrast of the optical image on the exit window, is adjustable. This offers more freedom in respect of imaging methods for which the exposure control of the X-ray examination apparatus in accordance with the invention supplies an adequate control signal. For series of images with more or less image contrast and/or brightness variation, the amplifier can be adjusted by means of the control signal so as to supply a video signal for the reproduction of such series of images with a suitable diagnostic quality. Moreover, the adjustment facility enables easy adaptation of the exposure control to specific preferences of individual radiologists.

A further preferred embodiment of an X-ray examination apparatus in accordance with the invention is characterized in that the signal level of the control signal varies linearly as a function of the mean level between the two limit values.

One of the versions of a control signal which smoothly varies in a desired range and which can be readily realised is a control signal which varies linearly in said range. Such a signal is realised by multiplying the mean level detected by a factor which can be chosen to be adjustable, if desired. Such a multiplication can be executed by means of an electronic multiplier circuit. The linear variation can be realised, without introducing disturbances in the image displayed, by means of an electronic multiplier circuit which is known per se.

A further preferred embodiment of an X-ray examination apparatus in accordance with the invention is characterized in that the exposure control comprises arithmetic means for determining an auxiliary control signal level which assumes the maximum level when the mean level equals the first limit value and which assumes the minimum level when the mean level equals the second limit value, and also comprises a first comparison circuit for supplying the lower one of the maximum level and the auxiliary control signal level, and a second comparison circuit for supplying the control signal whose signal level is the higher one of the minimum level and the output signal of the first comparison circuit.

Another version of a control signal which varies smoothly in a desired range and which can be readily realised is a control signal which is composed of a linear auxiliary control signal and the minimum and maximum levels. The arithmetic means serve inter alia to select for the signal level of the control signal the auxiliary control signal level in the range in which the smooth, notably linear variation is desired and to select outside this range the maximum level or the minimum level for the signal level of the control signal. This control signal adjusts the amplifier to a high gain in the case of a low mean brightness of the optical image on the exit window, adjusts the amplifier to a lower gain in the case of a high mean brightness of said optical image, and the gain varies smoothly, notably linearly, when the brightness of the optical image changes. Furthermore, the gain is adapted to the image contrast (in the measuring field) of the optical image in that the control signal is dependent on the maximum and minimum signal amplitudes of the electronic image signal.

A further preferred embodiment of an X-ray examination apparatus in accordance with the invention is characterized in that the selection means are operative to derive at least one measuring field from the electronic image signal.

The one or more measuring fields are preferably chosen on the basis of the image information in the optical image. It is thus achieved that the control signal is derived from interesting parts of the optical image, and notably not from overexposed or underexposed parts of the optical image. By precluding acquisition from notably underexposed or overexposed areas, a control signal is obtained in which no disturbances occur which are caused by underexposed areas which occur in the optical image due to X-ray absorption filters arranged in the X-ray beam, or by overexposed areas which are due to primary radiation being incident on the entrance screen of the X-ray image intensifier. Even in exceptional situations, for example if no image information is available in the optical image, a control signal is formed which does not cause disturbances. When a signal amplitude exceeds a predetermined upper limit, the exposure control means supplies a control signal to adjust the amplified video signal to a predetermined peak value; when a signal amplitude does not exceed a predetermined lower limit, the exposure control supplies a control signal to adjust the amplified video signal to a predetermined bottom value. The peak values and bottom values are preferably chosen so as to correspond to the signal amplitude range in which optimum operation of an apparatus takes place, for example a monitor for the display of the image.

An image pick-up device for forming an electronic image signal from an optical image, comprising an exposure control means with selection means for selecting at least one measuring field in the optical image, a maximum detector for detecting a maximum level derived from a maximum value of signal amplitudes of the image signal corresponding to at least one measuring field, a minimum detector for detecting a minimum level derived from a minimum value of signal amplitudes of the image signal corresponding to at least one measuring field, and a mean detector for detecting a mean level derived from a mean value of signal amplitudes of the image signal corresponding to at least one measuring field, is preferably also operative to form the control signal with the maximum level when the mean level exceeds a first limit value, with the minimum level unless the mean level exceeds a second limit value, and with a signal level which smoothly varies between the two limit values as a function of the mean level.

BRIEF DESCRIPTION OF THE DRAWING

The invention will be described in detail hereinafter on the basis of some embodiments and the accompanying drawings; therein.

DETAILED DESCRIPTION OF THE PREFERRED EMBODIMENTS

Figure 1:
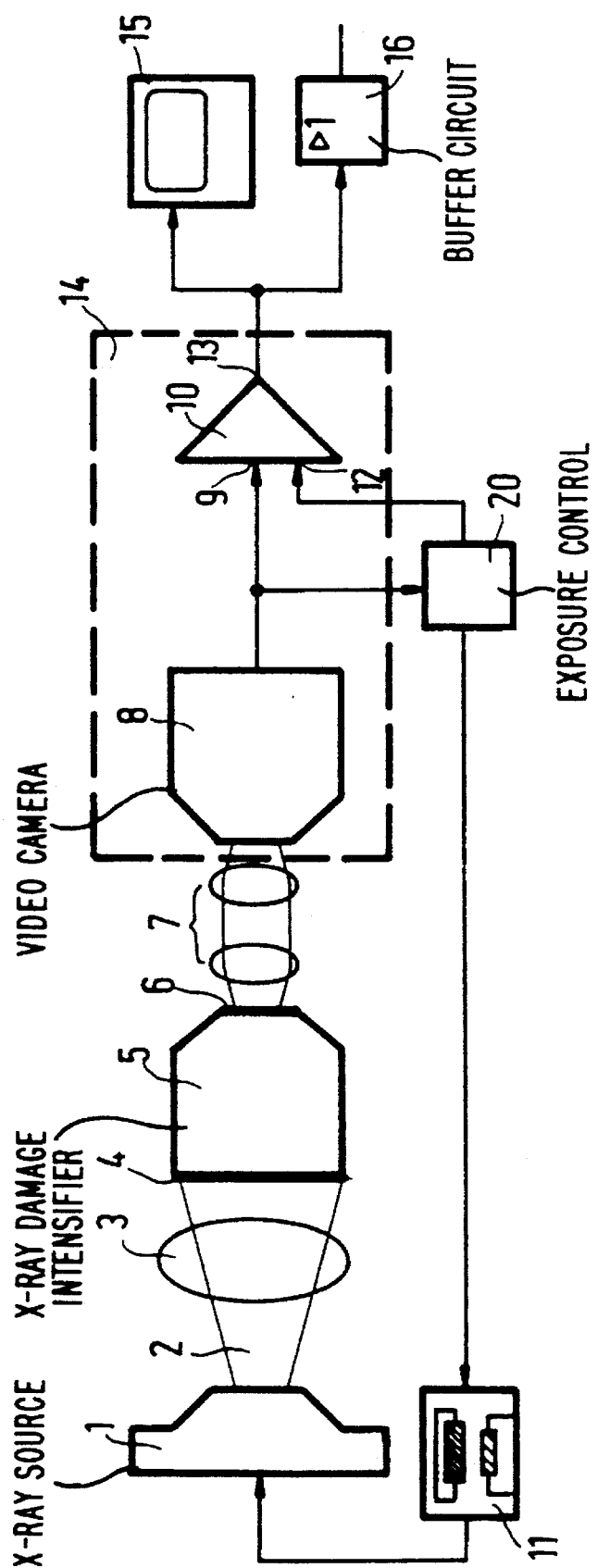
FIG. 1 shows a block diagram of an X-ray examination apparatus in accordance with the invention.

FIG. 1 shows a block diagram of an X-ray examination apparatus in accordance with the invention, comprising an X-ray source 1 which emits an X-ray beam 2 in order to form an X-ray image of an irradiated object 3, for example a patient to be examined, on the entrance screen 4 of an X-ray image intensifier 5. The X-ray image is convened into an optical image on the exit window 6 by the X-ray image intensifier. Via a lens system 7, the optical image is imaged on a video camera 8 which forms an electronic image signal from the optical image. The electronic image signal is applied on the one hand to an input terminal 9 of an amplifier 10. On the other hand, the electronic image signal is applied to an exposure control 20. The exposure control supplies a control signal as an X-ray control signal to a power supply 11 of the X-ray source 1 in order to control the intensity, the energy and the pulse duration of the radiation emitted by the X-ray source. The exposure control means also applies a control signal as an exposure control signal to a control input 12 of the amplifier 10 in order to adjust the amplification of the electronic image signal. An output terminal 13 of the amplifier 10 carries a video signal which is applied to a monitor 15 on which an image can be observed, or the video signal is applied to a buffer circuit 16 so as to await further image processing. The amplification of the electronic image signal is adjusted so that annoying brightness variations are suppressed as much as possible during dynamic imaging. In the embodiment shown in FIG. 1 the amplifier 10 is shown to be connected in series with the video camera 8. In this case the video camera with the amplifier 10 constitutes an image pick-up device 14 for picking up the optical image on the exit window 6 and for converting it into a video signal. However, it is equally well possible to include the amplifier 10 in the video camera 8; in that case the video camera itself constitutes the image pick-up device.

Figure 2:
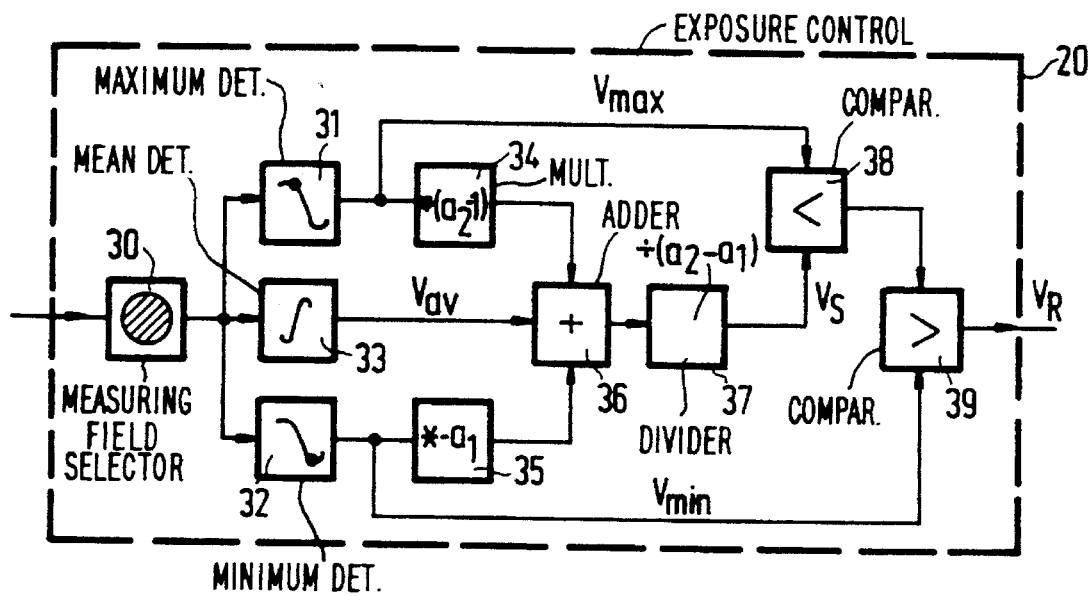
FIG. 2 shows a block diagram of an exposure control means for an X-ray apparatus in accordance with the invention.

FIG. 2 shows a block diagram of an exposure control for an X-ray apparatus in accordance with the invention. Using a measuring field selector 30, a measuring field video signal is formed from the electronic image signal, which video signal corresponds to a part of the optical image. Such a part is chosen to include that part of the image which is of importance to optimize image contrast and image brightness. For example, for cardiography such a part constitutes a circular area at the centre of the image, and for peripheral angiography such a part consists of one or more bands in the image. The measuring field can also be derived from the electronic image signal in order to base the control signal on a part of the image which is of particular importance, or also to exclude irrelevant parts of the image, such as underexposed or overexposed areas, from the formation of the control signal. The measuring field video signal is applied to a maximum detector 31, a minimum detector 32 and a mean value detector 33 which detect the highest, the lowest and the mean signal value, respectively, in the measuring field video signal. The maximum, minimum and mean value detectors can be composed of electronic components, such as integration circuits with operational amplifiers and semiconductor diodes, which may be constructed as an integrated circuit as is known per se from German Auslegeschrift DE 26 10 845 (FIG. 2). A maximum signal $V_{max}$, a minimum signal $V_{min}$ and a mean value signal $V_{av}$ are available on the output terminals of the maximum, minimum and mean value detectors, respectively. If desired, different measuring fields may be selected for supply to the maximum detector, the minimum detector, and the mean value detector, respectively.

The maximum signal is applied to a first multiplier 34 so as to be multiplied by a factor $a_2-1$; the minimum signal is applied to a second multiplier 35 and multiplied by a factor $-a_1$. The output signals of the two multipliers 34, 35 and of the mean value detector 33 are added in an adder and the added signal on the output terminal of the adder 36 is divided by a factor $a_2-a_1$ at by means of a divider 37. The output terminal of the divider 37 supplies a signal $V_s$ which is a combination of the maximum, the minimum and the mean signals, i.e.

$$V_s=[(a_2-1)V_{max}-a_1V_{min}+V_{av})]/(a_2-a_1). \qquad (1)$$

The signal $V_s$ on the output terminal of the divider 37 and the maximum signal $V_{max}$ on the output terminal of the maximum detector 31 are applied as input signals to a comparison circuit 38. The output signal of the comparison circuit 38 is a signal having an amplitude which is the lower one of the input signals applied to the comparison circuit 38. The output signal of the comparison circuit 38 is subsequently applied, together with the minimum signal on the output terminal of the minimum detector 32, as an input signal to a second comparison circuit 39. From the input signals received, the second comparison circuit 39 forms an output signal having an amplitude which is the higher of the applied input signals. The control signal is then available on the output terminal of the second comparison circuit 39. Consequently, the control signal $V_R$ relates with the minimum, maximum and mean value signals as follows:

$$V_R=max[min(V_{max},V_s),V_{min}] \qquad (2)$$

This control signal offers the advantage that the variations of the control signal due to brightness and contrast variations in the optical image are smooth, so that notably in the case of dynamic imaging sudden, annoying brightness variations are avoided in the image displayed.

Figure 3:
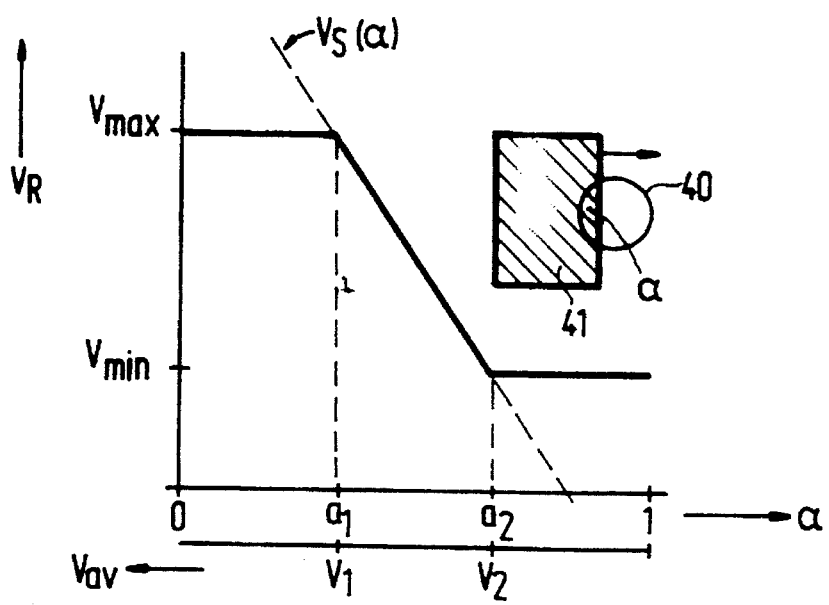
FIG. 3 is a graphic representation of a control signal as supplied by the exposure control means of FIG. 2 when a uniform X-ray attenuating object is introduced into an image of uniform brightness.

The smoothness of the variation of the control signal will be explained hereinafter on the basis of an example. To this end, FIG. 3 is a graphic representation of a control signal as supplied by the exposure control means shown in FIG. 2 when instead of a patient 3 to be examined an object exhibiting uniform X-ray attenuation is introduced into an image of uniform brightness. When this object, for example a copper plate of uniform thickness and composition, is moved into the X-ray beam 2, a coverage fraction $\alpha$ of the measuring field which corresponds to a part of the X-ray beam will increase from 0 to 1. This will be explained on the basis of the insert in FIG. 3 in which a circular measuring field 40 is shown which is partly covered by the shadow image 41 of the copper plate introduced into the X-ray beam. When the copper plate is moved into the X-ray beam, its shadow image is shifted across the measuring field as denoted by the arrow. For the mean signal supplied by the mean value detector it simply holds that $$V_{av}=V_{max}-\alpha(V_{max}-V_{min}) \qquad (3)$$

and the expression (1) for $V_s$ can be written as $$V_s=[a_2V_{max}-a_1V_{min}-\alpha(V_{max}-V_{min})]/(a_2-a_1). \qquad (4)$$

Thus, when the coverage fraction $\alpha$ increases between the predetermined limit values $a_1$ and $a_2$, the amplitude of the control signal $V_R$ decreases from the value $V_{max}$ to the value $V_{min}$. For coverage fractions smaller than $a_1$, the amplitude of the control signal has the value $V_{max}$, whereas for coverage tractions larger than $a_2$ the control signal has an amplitude $V_{min}$. The mean signal $V_{av}$ is plotted along a second horizontal axis in FIG. 3, so that FIG. 3 also shows the control signal as a function of the mean signal $V_{av}$. When the mean signal $V_{av}$ exceeds a first limit value $V_1$, the control signal $V_R$ has the maximum level $V_{max}$. When the mean signal $V_{av}$ drops below a second limit value $V_2$, the control signal $V_R$ has the minimum level $V_{min}$. When the value of the mean signal is between the two limit values, the variation of the control signal is linear. As a result of this exposure control, the signal amplification of the electronic image signal is smoothly adjusted when the contrast and the brightness in the optical image on the exit window 6 change. The control of the power supply 11 by means of the control signal supplied by the exposure control means 20 is also smooth. Because of these smooth controls, sudden variations in the signal level of the video signal are avoided and sudden, undesirable brightness variations are prevented in the image displayed on the monitor on the basis of the amplified video signal.

I claim:

1. An X-ray examination apparatus, comprising an X-ray source for forming an X-ray image by irradiation of an object by means of X-rays, an X-ray image intensifier for converting the X-ray image into an optical image, and an image pick-up device for forming an electronic image signal from the optical image, which image pick-up device comprises an exposure control means for applying a control signal, derived from the electronic image signal, to a control input of an amplifier of the image pick-up device, which exposure control means comprises selection means for selecting at least one measuring field in the optical image, a maximum detector for detecting a maximum level derived from a maximum value of signal amplitudes of the image signal corresponding to at least one measuring field, a minimum detector for detecting a minimum level derived from a minimum value of signal amplitudes of the image signal corresponding to at least one measuring field, and a mean value detector for detecting a mean level derived from a mean value of signal amplitudes of the image signal corresponding to at least one measuring field, characterized in that the exposure control means is also operative to form the control signal with the maximum level when the mean level exceeds a first limit value, with the minimum level when the mean level drops below a second limit value, and with a signal level which varies smoothly between the two limit values as a function of the mean level.

2. An X-ray examination apparatus as claimed in claim 1, characterized in that the minimum level, the maximum level and the limit values are adjustable.

3. An X-ray examination apparatus as claimed in claim 1, characterized in that the signal level of the control signal varies linearly as a function of the mean level between the two limit values.

4. An X-ray examination apparatus as claimed in claim 3, characterized in that the exposure control means comprises arithmetic means for determining an auxiliary control signal level which assumes the maximum level when the mean level equals the first limit value and which assumes the minimum level when the mean level equals the second limit value, and also comprises a first comparison circuit for supplying the lower one of the maximum level and the auxiliary control signal level, and a second comparison circuit for supplying the control signal whose signal level is the higher one of the minimum level and the output signal of the first comparison circuit.

5. An X-ray examination apparatus as claimed in claim 1, characterized in that the selection means are operative to derive at least one measuring field from the electronic image signal.

6. An X-ray examination apparatus as claimed in claim 4, characterized in that the selection means are operative to derive at least one measuring field from the electronic image signal.

7. An X-ray examination apparatus as claimed in claim 2 or claim 2, characterized in that the signal level of the control signal varies linearly as a function of the mean level between the two limit values.

8. An X-ray examination apparatus as claimed in claim 7, characterized in that the exposure control means comprises arithmetic means for determining an auxiliary control signal level which assumes the maximum level when the mean level equals the first limit value and which assumes the minimum level when the mean level equals the second limit value, and also comprises a first comparison circuit for supplying the lower one of the maximum level and the auxiliary control signal level, and a second comparison circuit for supplying the control signal whose signal level is the higher one of the minimum level and the output signal of the first comparison circuit.

9. An X-ray examination apparatus as claimed in claim 2, characterized in that the selection means are operative to derive at least one measuring field from the electronic image signal.

10. An X-ray examination apparatus as claimed in claim 3, characterized in that the selection means are operative to derive at least one measuring field from the electronic image signal.

11. An X-ray examination apparatus as claimed in claim 7, characterized in that the selection means are operative to derive at least one measuring field from the electronic image signal.

12. An X-ray examination apparatus as claimed in claim 8, characterized in that the selection means are operative to derive at least one measuring field from the electronic image signal.

* * * * *